No. 772,317. PATENTED OCT. 11, 1904.
A. C. E. RATEAU & G. SAUTTER.
COUPLING.
APPLICATION FILED DEC. 9, 1903.
NO MODEL. 3 SHEETS—SHEET 1.

No. 772,317. PATENTED OCT. 11, 1904.
A. C. E. RATEAU & G. SAUTTER.
COUPLING.
APPLICATION FILED DEC. 9, 1903.
NO MODEL. 3 SHEETS—SHEET 3.

No. 772,317.

Patented October 11, 1904.

UNITED STATES PATENT OFFICE.

AUGUSTE CAMILLE EDMOND RATEAU AND GASTON SAUTTER, OF PARIS, FRANCE.

COUPLING.

SPECIFICATION forming part of Letters Patent No. 772,317, dated October 11, 1904.

Application filed December 9, 1903. Serial No. 184,508. (No model.)

*To all whom it may concern:*

Be it known that we, AUGUSTE CAMILLE EDMOND RATEAU and GASTON SAUTTER, residing at Paris, France, have invented a new and useful Improvement in Couplings, which improvement is fully set forth in the following specification.

The employment of generators of electricity, such as dynamos or alternators rotating at a great speed and driven directly by steam-turbines, and the employment of centrifugal or rotary pumps, fans, and, in a word, of all rapidly-rotating machines actuated either electrically or mechanically has necessitated the manufacture of couplings which allow the transmission of high mechanical powers, but which at the same time allow a certain degree of independence to the two shafts to be coupled. Many systems which work well with medium speeds do so no longer with the great speeds at which it is desired to use them. Not only does centrifugal force occur at the periphery of the coupling itself, but the lengthening of the flexible portions, in some cases, tends to create considerable longitudinal strains and very inconvenient axial movements.

The coupling forming the subject of the present invention, which is intended to obviate these evils, is shown in the annexed drawings, in which—

Figure 1:
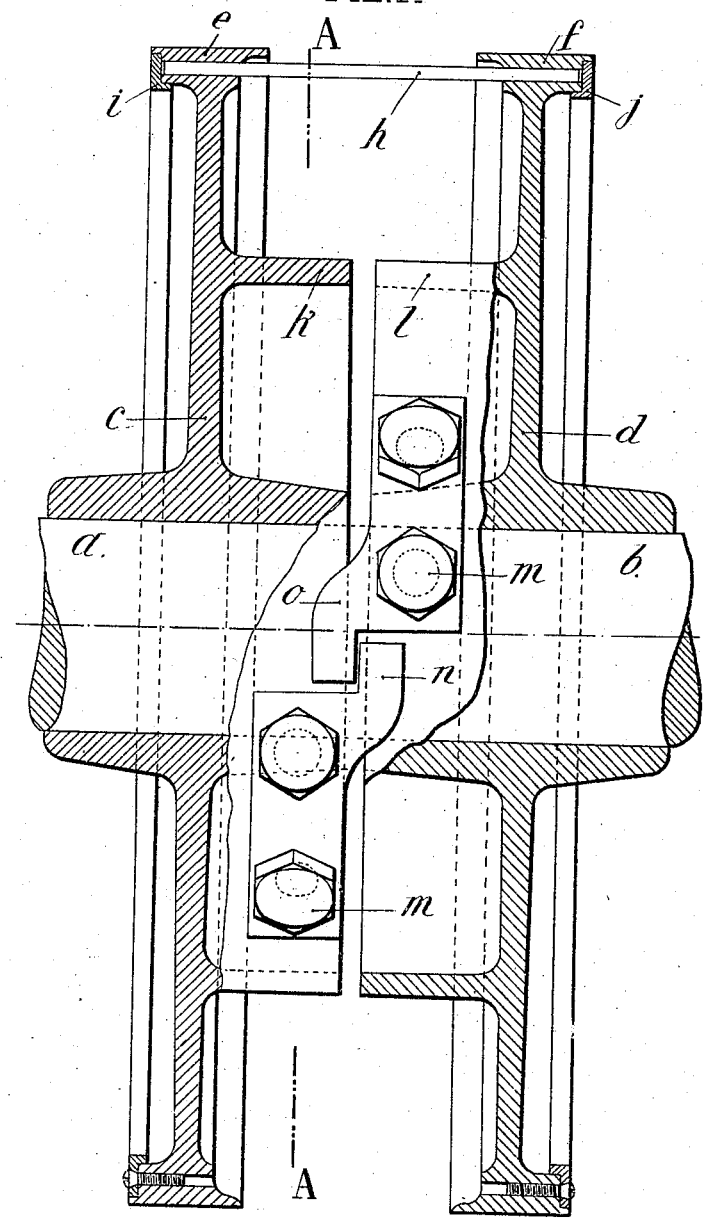
Figure 2:
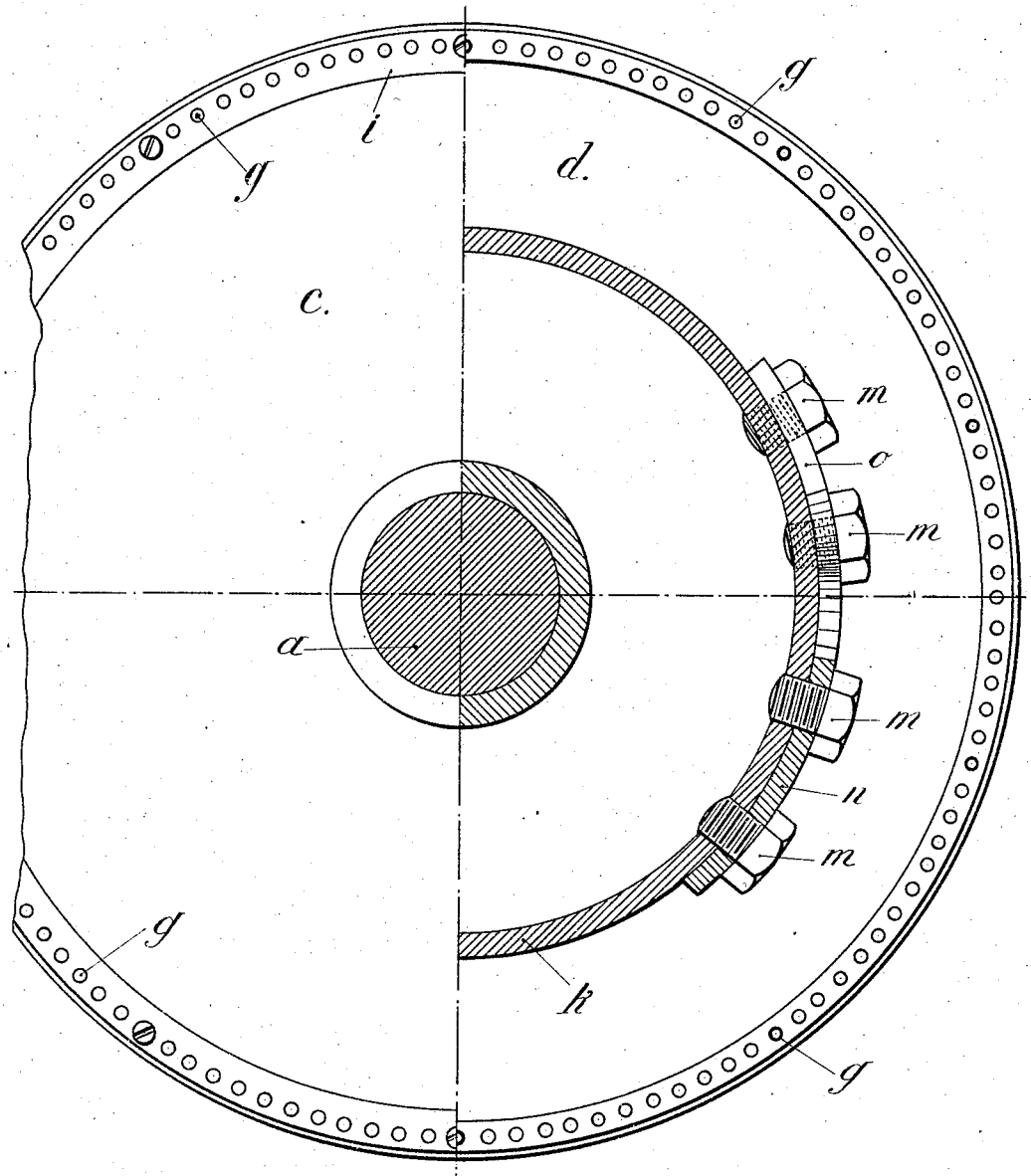
Figure 3:
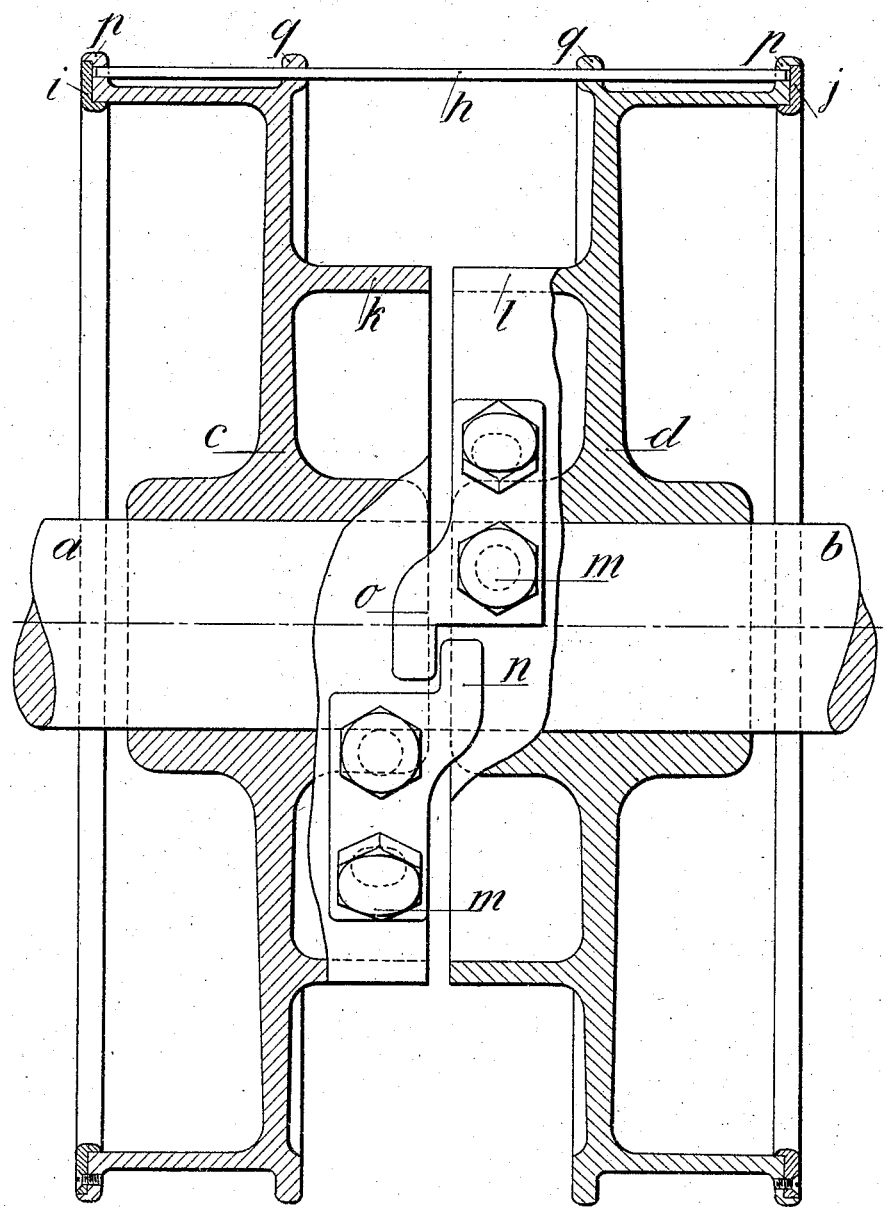

Figure 1 is a partial longitudinal section; Fig. 2, a side elevation, partly in section, on the line A A of Fig. 1. Fig. 3 shows a partial longitudinal section of a modification of the coupling.

Upon the two ends of the shafts $a$ and $b$, which are to be coupled, are fixed two wheels $c$ and $d$. Each wheel carries at its periphery a rim $e$ and $f$, provided with a series of holes $g$ parallel to the axis, the centers of which are on a common circumferential line. In the holes $g$ engage a series of flexible metal rods $h$, fitting freely into the holes $g$. The axial length of these recesses is sufficient to properly recess the different rods and at the same time allow the two wheels to approach each other during rotation, the rods being able to slide frictionally in their recesses. The rods are supported in the holes $g$ by two rings $i j$, fixed to the periphery of the wheels and which prevent them from passing out of their sockets. Each wheel carries midway a flange $k l$ parallel to the axis. Upon the said flanges $k l$ are fixed, by means of nuts $m$, tappets $n o$, which limit the angular and longitudinal movement of the two shafts, limiting at the same time also the flexion of the rods in the case of an abnormal strain.

The working of the coupling is very simple. The shaft $a$ drives the shaft $b$ through the intermediary of the rods which transmit the tangential strain of the wheel $c$ to the wheel $d$. The fitting in of the two ends of the rods, which forms a true recessing, allows them to bend sufficiently to reduce to a negligible quantity the strain due to any defect of mounting the two shafts without causing a reaction in a longitudinal direction.

The fitting of the rods $h$ into the wheels $c$ and $d$ may with advantage be modified in the manner shown in Fig. 3, which considerably increases flexibility. The two wheels carry no longer at their peripheries two rims pierced with holes; but each wheel is provided with two circumferential flanges $p$ and $q$. The said flanges are provided with a series of holes, through which the rods $h$ are passed. It will be seen, therefore, that the rods $h$ no longer fit into recesses for a considerable portion of their length, but at the two points $p$ and $q$ only of the rod. This method of fitting the rod greatly increases flexibility, because not only the portion of the rod between the two wheels can be deflected as in the first arrangement, but also that portion situated between the two points $p$ and $q$. It results that the same strain due to the non-coincidence of the axes of the shafts corresponds to a much greater flexion of the rod, and consequently the vibration caused by this strain due to the eccentricity is much less because the flexibility of the entire rod is increased.

Having now particularly described and ascertained the nature of our said invention and in what manner the same is to be performed, we declare that what we claim is—

1. In a coupling, the combination, with two shafts extending in the same general direction, of wheels mounted on the adjoining ends thereof and spaced apart, and rods fitted loosely within and connecting the two wheels.

2. In a coupling, the combination, with two shafts extending in the same general direction, of wheels mounted on the adjoining ends thereof and spaced apart, and resilient rods fitted loosely within and connecting the circumferences of the two wheels.

3. In a coupling, the combination, with two shafts, of wheels mounted on the adjoining ends thereof, rods passing through and connecting the wheels and having a bearing in each wheel at spaced intervals.

4. In a coupling, the combination, with two shafts, of wheels mounted on the adjoining ends thereof, resilient rods passing through and connecting the circumferences of the wheels and having a bearing in each wheel at two points.

5. In a coupling, the combination, with two shafts, of wheels mounted on the adjoining ends thereof, each wheel provided with peripheral flanges, and rods passing loosely through the flanges and connecting the two wheels.

6. In a coupling, the combination, with two shafts, of spaced wheels mounted on the adjoining ends thereof, each wheel provided with peripheral flanges on each side, and resilient rods passing loosely through the flanges and connecting the two wheels.

7. In a coupling, the combination, with two shafts extending in the same general direction, of wheels mounted on the adjoining ends thereof, resilient rods fitted loosely within and connecting the two wheels, and means for locking the two wheels against displacement axially.

8. In a coupling, the combination, with two shafts, of wheels mounted on the adjoining ends thereof, resilient rods fitted loosely within and connecting the two wheels, and means for interlocking the two wheels to limit relative rotary displacement and to prevent axial displacement.

In testimony whereof we have signed this specification in the presence of two subscribing witnesses.

AUGUSTE CAMILLE EDMOND RATEAU.
GASTON SAUTTER.

Witnesses:
JEAN VANCHEY,
H. O. VORCE.